United States Patent
Herman et al.

(10) Patent No.: US 6,481,729 B2
(45) Date of Patent: Nov. 19, 2002

(54) FOLDABLE SCOOTER AND METHOD OF USE

(75) Inventors: William P. Herman, Marblehead, MA (US); Eric P. Thomas, Little Compton, RI (US)

(73) Assignee: HL Corporation, Hsin Chu Hsien (TW)

( * ) Notice: Subject to any disclaimer, the term of this patent is extended or adjusted under 35 U.S.C. 154(b) by 0 days.

(21) Appl. No.: 09/828,280

(22) Filed: Apr. 5, 2001

(65) Prior Publication Data

US 2001/0035621 A1 Nov. 1, 2001

Related U.S. Application Data

(60) Provisional application No. 60/194,960, filed on Apr. 5, 2000.

(51) Int. Cl.$^7$ .................................................. B62M 1/00
(52) U.S. Cl. ............................. 280/87.05; 280/87.041
(58) Field of Search .................. 280/87.01, 87.021, 280/87.041, 87.042, 87.05, 842, 278, 287; 180/209

(56) References Cited

U.S. PATENT DOCUMENTS

| | | | |
|---|---|---|---|
| 1,951,277 A | | 3/1934 | Elliotte |
| 2,002,520 A | | 5/1935 | Bontrager |
| 2,111,691 A | | 3/1938 | Salsbury |
| 2,211,164 A | * | 8/1940 | Rippenbein ................ 280/287 |
| 2,439,556 A | | 1/1948 | Bancroft |
| 2,460,395 A | | 2/1949 | Reid |
| 3,623,749 A | | 11/1971 | Jensen |
| 4,076,270 A | | 2/1978 | Winchell |
| 4,274,647 A | * | 6/1981 | Drake, Jr. .............. 280/87.042 |
| 4,634,138 A | * | 1/1987 | Fryer et al. ................ 280/278 |
| D289,065 S | | 3/1987 | Schultz |
| 4,707,884 A | | 11/1987 | Chang |
| 4,821,832 A | | 4/1989 | Patmont |
| 4,955,628 A | | 9/1990 | Chiu |
| D317,954 S | | 7/1991 | Cohen |
| 5,183,129 A | | 2/1993 | Powell |
| 5,265,695 A | | 11/1993 | Piazzi |
| 5,388,659 A | | 2/1995 | Pepe |
| 5,848,660 A | | 12/1998 | McGreen |
| 5,927,733 A | * | 7/1999 | Banda .................... 280/87.041 |
| 6,139,035 A | | 10/2000 | Tsai |
| 6,179,307 B1 | * | 1/2001 | Mao ...................... 280/87.041 |
| 6,305,698 B1 | * | 10/2001 | Liang .................... 280/87.041 |
| 6,318,741 B1 | * | 11/2001 | Chen ..................... 280/87.041 |

FOREIGN PATENT DOCUMENTS

| | | | | |
|---|---|---|---|---|
| CH | WO 99/00290 | | 1/1999 | |
| DE | 299 01 184 U | | 8/1999 | |
| GB | 264987 | * | 2/1927 | .............. 280/87.05 |
| GB | 1050810 | * | 12/1966 | ................. 280/278 |
| IT | WO 95/34461 | | 12/1995 | |
| WO | 90/03301 | * | 4/1990 | ................. 280/278 |
| WO | WO 98/46475 | | 10/1998 | |

* cited by examiner

*Primary Examiner*—Frank Vanaman
(74) *Attorney, Agent, or Firm*—Eric Karich

(57) ABSTRACT

A foldable scooter, that can be folded from an assembled configuration to a compact configuration, has a head tube attached to a front end, the head tube being shaped to rotatably accept a steering column attached to a yoke, the yoke rotatably mounting a front wheel. At least one strut is pivotally attached to the yoke. A handlebar stem, having a handlebar at an upper end and a cap receiving portion at a lower end, is attached to a mounting bracket that is slidably mounted upon at least one strut, enabling the handlebar stem to slide between a lowered position in which the cap receiving portion operatively engages the steering cap, and a raised position in which the cap receiving portion is lifted clear of the steering cap.

6 Claims, 3 Drawing Sheets

FOLDABLE SCOOTER AND METHOD OF USE

CROSS-REFERENCE TO RELATED APPLICATIONS

This application for a utility patent claims the benefit of U.S. Provisional Application No. 60/194,960, filed Apr. 5, 2000.

STATEMENT REGARDING FEDERALLY SPONSORED RESEARCH

Not Applicable

BACKGROUND OF THE INVENTION

1. Field of the Invention

This invention relates generally to scooters, and more particularly to a foldable scooter.

2. Description of Related Art

Various foldable scooters are shown in the prior art. Modem examples of foldable scooters are shown in Cianchetti, W. O. 95/34461, McGreen, W. O. 98/46475, and Ouboter, W. O. 00290. Older examples of various scooters are shown in Powell, U.S. Pat. No. 5,183,129 and Salsbury, U.S. Pat. No. 2,111,691. While these scooters reduce size in a stored form, they sometimes sacrifice strength and safety for portability. A known problem of many collapsible scooters is that they can collapse following rigorous use. Since the collapse of the scooter can cause grave injury to the user, it is highly desirable to provide a scooter that is portable, but still very strong and resistant to collapse during use.

The prior art teaches various foldable scooters. However, the prior art does not teach a foldable scooter having the strength and reliability of the present invention. The present invention fulfills these needs and provides further related advantages as described in the following summary.

SUMMARY OF THE INVENTION

The present invention teaches certain benefits in construction and use which give rise to the objectives described below.

The present invention provides a foldable scooter that can be folded from an assembled configuration to a compact configuration. The scooter has a frame having a head tube attached to a front end, the head tube being shaped to rotatably accept a steering column attached to a yoke, the yoke rotatably mounting a front wheel. At least one strut is pivotally attached to the yoke. A handlebar stem, having a handlebar at an upper end and a cap receiving portion at a lower end, is attached to a mounting bracket that is slidably mounted upon at least one strut, enabling the handlebar stem to slide between a lowered position in which the cap receiving portion operatively engages the steering cap, and a raised position in which the cap receiving portion is lifted clear of the steering cap.

A primary objective of the present invention is to provide a foldable scooter having advantages not taught by the prior art.

Another objective is to provide a foldable scooter that can be collapsed to a small size when not in use.

A further objective is to provide a foldable scooter that does not collapse when in use, despite rigorous treatment.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
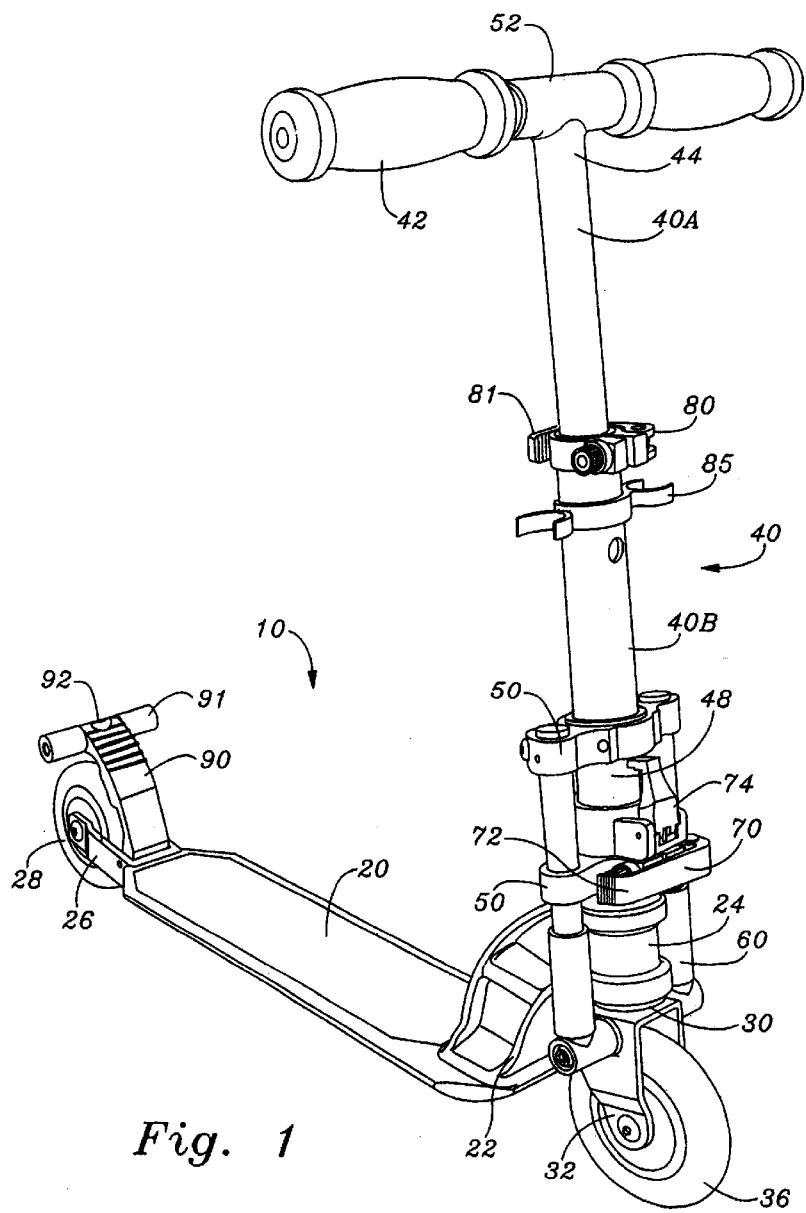
FIG. 1 is a perspective view of the preferred embodiment of the present invention illustrating a handlebar stem of a scooter in an assembled configuration.
Figure 4:
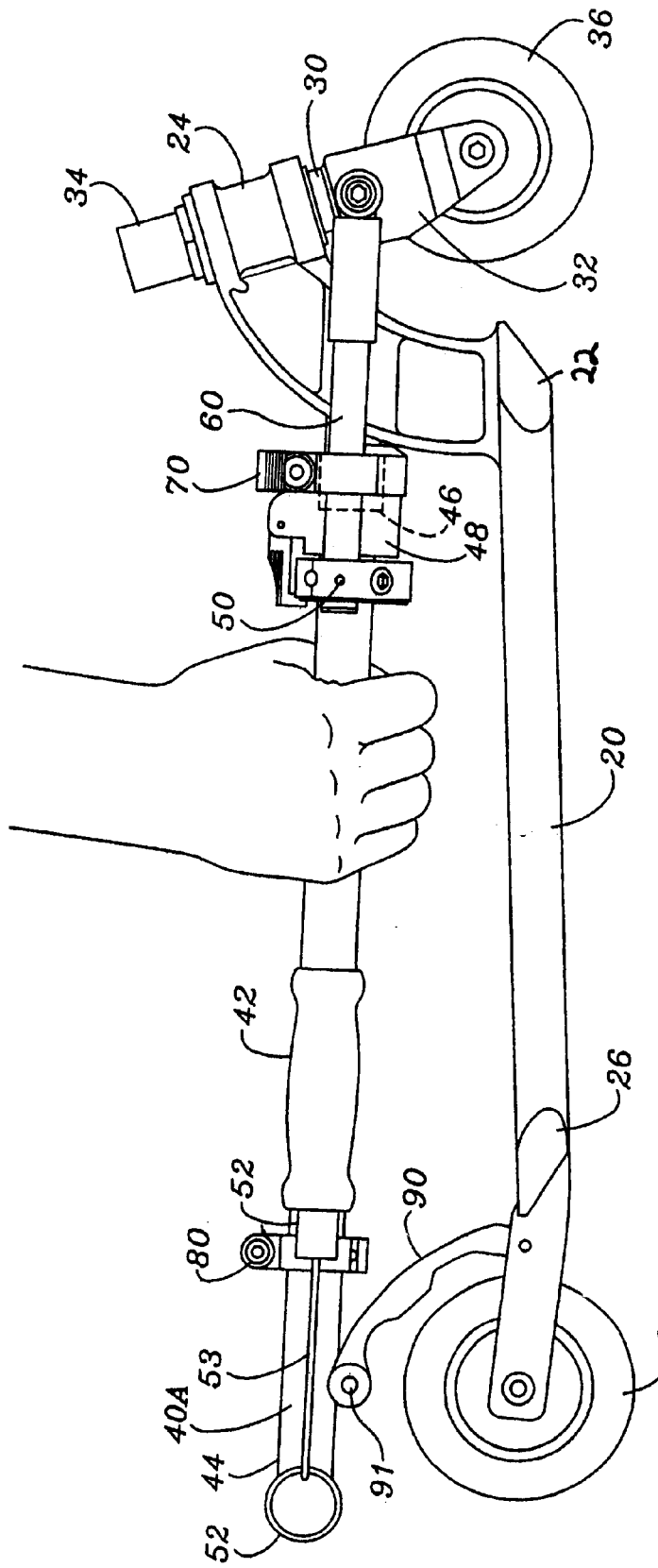
FIG. 4 is a side elevational view illustrating a user carrying the scooter while the handlebar stem of the scooter in a compact configuration.

The above described drawing figures illustrate the invention, a foldable scooter 10 that can be folded from an assembled configuration, shown in FIG. 1, to a compact configuration, shown in FIG. 4. The scooter 10 has a frame 20 having a head tube 24 attached to a front end 22, the head tube 24 being shaped to rotatably accept a steering column 30 attached to a yoke 32, the yoke 32 rotatably mounting a front wheel 36. At least one strut 60 is pivotally attached to the yoke 32. A handlebar stem 40, having a handlebar 42 at an upper end 44 and a cap receiving portion 46 at a lower end 48, is attached to a mounting bracket 50 that is slidably mounted upon at least one strut 60, enabling the handlebar stem 40 to slide between a lowered position in which the cap receiving portion 46 operatively engages the steering cap 34, and a raised position in which the cap receiving portion 46 is lifted clear of the steering cap 34.

Figure 2:
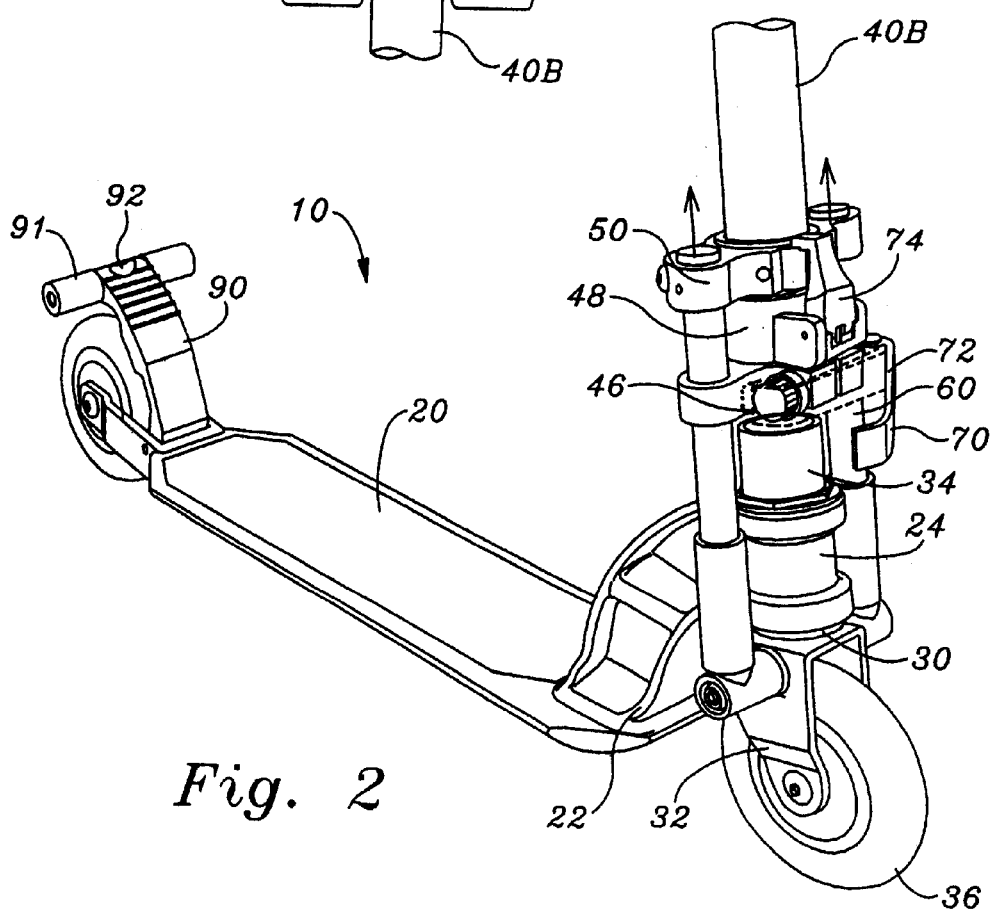
FIG. 2 is a perspective view thereof illustrating the scooter with the handlebar stem in a raised position.

As shown in FIGS. 1, 2, and 4, the scooter 10 has a frame 20 having a front end 22 a back end 26. The frame 20 is constructed of a strong, rigid material, preferably such as steel or aluminum. A rear wheel 28 is rotatably secured to the back end 26 of the frame 20. The basic structure of a scooter 10 is well known in the art, as shown in Powell, U.S. Pat. No. 5,183,129, Pepe, U.S. Pat. No. 5,388,659, McGreen, U.S. Pat. No. 5,848,660, hereby incorporated by reference in full.

As shown in FIG. 1, a head tube 24 is attached to the front end 22, preferable by welding or other attachment that provides a strong, integral connection. A benefit of this invention over many of the prior art references, such as Powell, U.S. Pat. No. 5,183,129 and McGreen, U.S. Pat. No. 5,848,660, is that the head tube 24 is well connected to the frame 20 without any weak pivot-points in the basic structure of the scooter 10. A steering column 30 extends through and pivotally engaging the head tube 24, the steering column 30 having a yoke 32 attached to one end and a steering cap 34 attached opposite the yoke 32. A front wheel 36 is rotatably secured to the yoke 32.

As shown in FIG. 1, the scooter 10 includes a handlebar stem 40 having a handlebar 42 at an upper end 44 and a cap receiving portion 46 at a lower end 48. The combination of the handlebar 42 and the handlebar stem 40 allow a user 12 of the scooter 10 to both balance upon the scooter 10, as well as steer and otherwise control the scooter 10. A mounting bracket 50 is mounted adjacent the lower end 48 of the handlebar stem 40; and at least one strut 60 slidably engaging the mounting bracket 50 for sliding the handlebar stem 40 between a lowered position in which the cap receiving portion 46 operatively engages the steering cap 34, as shown in FIG. 1, and a raised position in which the cap receiving portion 46 is lifted clear of the steering cap 34, as shown in FIG. 2.

The at least one strut 60 is pivotally attached to the yoke 32 for pivoting the handlebar stem 40 between an upright position for use of the scooter 10, as shown in FIG. 1, and a laid-over position for storage of the scooter 10, as shown in FIG. 4. In the preferred embodiment, the at least one strut 60 includes two struts 60 to provide the maximum strength and a preferred balance of forces within the structure of the scooter 10.

As shown in FIGS. 1 and 2, the foldable scooter 10 preferably further includes a means for locking the lower end 48 of the handlebar stem 40 to the steering cap 34. The means for locking is preferably a locking lever 70 that operatively positions a cam 72 on the mounting bracket 50 to engage the steering cap 34, either frictionally or otherwise, such as engaging a slot (not shown).

A locking arm 74 pivotally attached to the lower end 48 pivots between a locked position and an unlocked position. In the locked position, as shown in FIG. 1, the locking arm 74 abuts the mounting bracket 50 to prevent the handlebar stem 40 from accidentally disengaging from the steering cap 34. To raise the handlebar stem 40 to the raised position, the locking arm 74 must be lifted over the mounting bracket 50, as shown in FIG. 2. The locking arm 74 is preferably biased towards the locked position. As long as the locking arm 74 is in the locked position, the handlebar stem 40 cannot be pulled up and off of the steering cap 34. Since the user relies upon the handlebar stem 40 for support while riding the scooter 10, these safety features are important to the safety of the user while riding the scooter 10.

Figure 3:
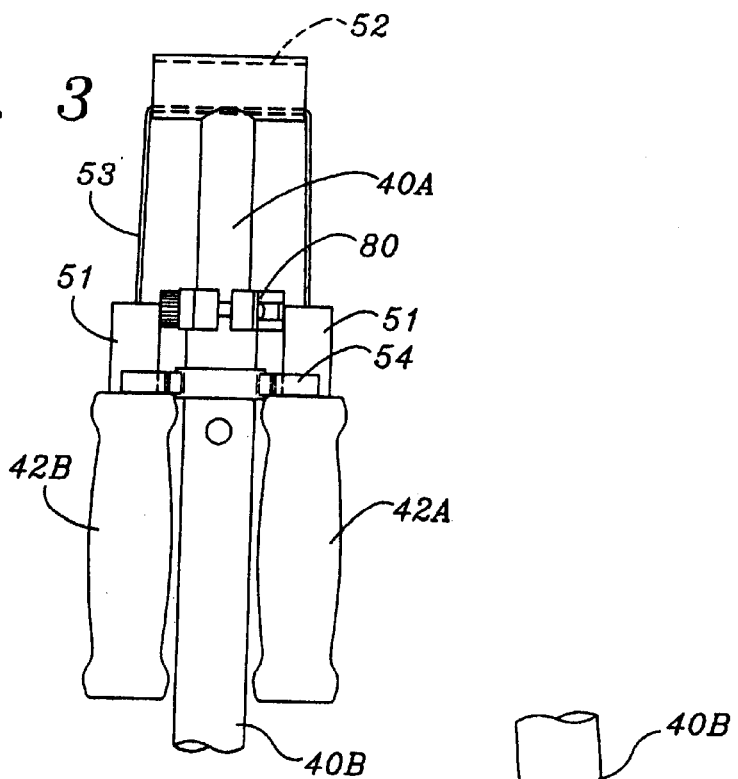
FIG. 3 is a front elevational view of the handlebar stem having a pair of handlebars, the pair of handlebars being positioned in a stored position.

In the preferred embodiment, as shown in FIGS. 1 and 3, the handlebar stem 40 includes a top handlebar stem 40A and a bottom handlebar stem 40B. The handlebar 42 is attached to the top handlebar stem 40A and the cap receiving portion 46 is provided within the bottom handlebar stem 40B. The top and bottom handlebar stems 40A and 40B telescopically engage each other, thereby allowing the overall length of the handlebar stem 40 to be adjusted between a lowered position, shown in FIG. 1, and a raised position, as shown in FIGS. 3 and 4. The handlebar stem 40 further includes a stem locking means for locking the position of the top handlebar stem 40A with respect to the bottom handlebar stem 40B. The stem locking means is preferably a locking cam 80 that enables the user to frictionally lock or unlock the handlebar stem 40 with the movement of a locking lever 81. Such locking mechanisms are well known in the art and are therefore not discussed in detail. Several examples of this type of locking mechanism are described in the above described patent references which were incorporated by reference in full.

As shown in FIG. 3, the handlebar 42 preferably includes two grip elements 42A and 42B, each of the two grip elements 42A and 42B having an inner handlebar portion 51 adapted to be inserted into and frictionally engage one end of a top tube 52 that is welded laterally across the upper end 44 of the top handlebar stem 40A. The two grip elements 42A and 42B are preferably connected to each other with an attachment cord 53 that passes through the top tube 52. When the top handlebar stem 40A is in the lowered position with respect to the bottom handlebar stem 40B, as shown in FIG. 3, the two grip elements 42A and 42B can be removed from the top tube 52 and frictionally attached to a C-clamp 54 attached to the bottom handlebar stem 40B, thereby allowing the scooter 10 to be stored in a much smaller space.

As shown in FIGS. 1 and 2, the scooter 10 further includes a rear fender 90 pivotably attached to the back end 26. The rear fender 90 not only protects the user from the rear wheel 28, it also provides a fulcrum braking mechanism. The rear fender 90 preferably further includes a pair of ears 91 extending outwardly from the rear fender 90. The pair of ears 91 provide a more stable support for the user when riding the scooter 10. The rear fender 90 preferably further includes a positioning dent 92 between the pair of ears 91. The positioning dent 92 contacts the top handlebar stem 40A when the handlebar stem 40 is in the laid-over position, as shown in FIG. 4.

The invention includes a method for folding the above described scooter 10. The at least one strut 60 is pivotally attached to the yoke 32. The mounting bracket 50 is then slidably engaged onto the at least one strut 60. The handlebar stem 40 is pivoted to an upright position; and the handlebar stem 40 is slidably lowered to a lowered position in which the cap receiving portion 46 operatively engages the steering cap 34, thereby configuring the foldable scooter 10 in the assembled configuration for use as a scooter 10. The assembled configuration is best shown in FIG. 1.

When it is desired to collapse the scooter 10 to the compact configuration, the user 12 lifts the locking lever 70, thereby moving the cam 72 from a locking position to an unlocking position, releasing the cap receiving portion 46 from the steering cap 34. At this point, the locking arm 74 must be lifted over the mounting bracket 50 to allow the handlebar stem 40 to be lifted to the raised position, as shown in FIG. 2, in which the cap receiving portion 46 is lifted clear of the steering cap 34.

Finally, the handlebar stem 40 is pivoted, on the at least one strut 60, to a laid-over position for storage of the foldable scooter 10, as shown in FIG. 4, and each of the two grip elements 42A and 42B are removed from the top tube 52 and attached to the C-clamp 54.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A foldable scooter comprising:

a frame having a front end, a back end;

a rear wheel rotatably secured to the back end of the frame, a head tube attached to the front end;

a steering column extending through and pivotally engaging the head tube;

a yoke attached to the steering column, the steering column having a steering cap opposite the yoke;

a front wheel rotatably secured to the yoke;

a handlebar stem having a handlebar at an upper end and a cap receiving portion at a lower end;

a mounting bracket mounted adjacent the lower end of the handlebar stem;

at least one strut slidably engaging the mounting bracket for sliding the handlebar stem between a lowered position in which the cap receiving portion operatively engages the steering cap, and a raised position in which the cap receiving portion is lifted clear of the steering cap; and the at least one strut being pivotally attached to the yoke for pivoting the handlebar stem between an upright position for use of the foldable scooter, and a laid-over position for storage of the foldable scooter.

2. The foldable scooter of claim 1 further comprising a means for locking the lower end of the handlebar stem to the steering cap.

3. The foldable scooter of claim 2 wherein the means for locking the lower end of the handlebar stem to the steering cap includes a locking arm pivotally attached to the lower end, the locking arm pivoting between a locked position and an unlocked position, wherein, in the locked position, the locking arm abuts the mounting bracket to prevent the handlebar stem from accidentally disengaging from the steering cap.

4. The foldable scooter of claim 1 wherein the handlebar stem includes a top handlebar stem and a bottom handlebar stem, the handlebar being attached to the top handlebar stem and the cap receiving portion being provided by the bottom handlebar stem, the top and bottom handlebar stems being telescopically engaged, the handlebar stem further including a stem locking means for locking the position of the top handlebar stem with respect to the bottom handlebar stem, thereby allowing the overall length of the handlebar stem to be adjusted.

5. The foldable scooter of claim 1 wherein the handlebar further includes two grip elements, each of the two grip elements having an inner handlebar portion adapted to be inserted into and frictionally engage one end of a top tube that is welded laterally across the upper end of the top handlebar stem.

6. A method for folding a scooter, the method comprising the steps of:

a) providing a foldable scooter having:
   a frame having a front end, a back end;
   a rear wheel rotatably secured to the back end of the frame;
   a head tube attached to the front portion;
   a steering column extending through and pivotally engaging the head tube;
   a yoke attached to the steering column, the steering column having a steering cap opposite the yoke;
   a front wheel rotatably secured to the yoke;
   a handlebar stem having a handlebar at an upper end and a cap receiving portion at a lower end;
   a mounting bracket mounted adjacent the lower end of the handlebar stem; and
b) providing at least one strut;
c) pivotally attaching the at least one strut to the yoke;
d) slidably engaging the mounting bracket onto the at least one strut;
e) pivoting the handlebar stem to an upright position;
f) sliding the handlebar stem to a lowered position in which the cap receiving portion operatively engages the steering cap, thereby configuring the foldable scooter for use;
g) lifting the handlebar stem to a raised position in which the cap receiving portion is lifted clear of the steering cap; and
h) pivoting the handlebar stem, on the at least one strut, to a laid-over position for storage of the foldable scooter.

* * * * *